United States Patent
Gorny et al.

(10) Patent No.: US 6,861,460 B2
(45) Date of Patent: Mar. 1, 2005

(54) COMPOSITIONS CONTAINING POLYCARBONATE

(75) Inventors: Rüdiger Gorny, Krefeld (DE); Siegfried Anders, Köln (DE); Wolfgang Nising, St. Augustin (DE)

(73) Assignee: Bayer Aktiengesellschaft, Leverkusen (DE)

( * ) Notice: Subject to any disclaimer, the term of this patent is extended or adjusted under 35 U.S.C. 154(b) by 105 days.

(21) Appl. No.: 10/239,719

(22) PCT Filed: Mar. 19, 2001

(86) PCT No.: PCT/EP01/03115

§ 371 (c)(1),
(2), (4) Date: Sep. 25, 2002

(87) PCT Pub. No.: WO01/74935

PCT Pub. Date: Oct. 11, 2001

(65) Prior Publication Data

US 2003/0083207 A1 May 1, 2003

(30) Foreign Application Priority Data

Mar. 30, 2000 (DE) .......................... 100 15 863

(51) Int. Cl.$^7$ .............................................. C08K 5/101
(52) U.S. Cl. ........................................ 524/318; 524/315
(58) Field of Search ................................. 524/315, 318

(56) References Cited

U.S. PATENT DOCUMENTS

| | | | | |
|---|---|---|---|---|
| 4,446,268 A | | 5/1984 | Lee ............................ 524/315 |
| 4,686,256 A | * | 8/1987 | Boutni ....................... 524/318 |
| 5,001,180 A | | 3/1991 | Lundy et al. ................ 524/314 |
| 5,055,508 A | | 10/1991 | Ohtsubo ..................... 524/128 |
| 5,108,835 A | | 4/1992 | Hähnsen et al. ............ 428/334 |
| 5,238,985 A | | 8/1993 | O'Lenick, Jr. ............. 524/308 |
| 5,795,695 A | * | 8/1998 | Malhotra et al. ........... 430/120 |
| 5,856,012 A | | 1/1999 | Kühling et al. ............. 428/412 |
| 6,359,042 B1 | | 3/2002 | Anders et al. ............... 524/91 |

FOREIGN PATENT DOCUMENTS

| | | |
|---|---|---|
| EP | 0 110 221 | 4/1987 |
| EP | 0 552 680 | 7/1993 |

* cited by examiner

*Primary Examiner*—Peter Szekely
(74) *Attorney, Agent, or Firm*—Joseph C. Gil; Aron Preis; James R. Franks

(57) ABSTRACT

Compositions containing polycarbonate and one or more esters derived from a linear carboxylic acid and branched alcohol are disclosed. The inventive compositions feature improved processing properties and are especially suitable for preparing extruded articles.

8 Claims, No Drawings

COMPOSITIONS CONTAINING POLYCARBONATE

The present invention concerns compositions containing polycarbonate and esters of a linear carboxylic acid and a branched alcohol, together with products manufactured from these compositions.

Compositions containing polycarbonates are commonly used plastics. They are utilised in many different areas. A wide variety of products, including sheets, are produced from the compositions by means of conventional processing methods, such as injection moulding or extrusion.

In addition to polycarbonate, the compositions conventionally contain other components that improve the properties of the composition. Examples of these include lubricants. Carboxylic acid esters, for example, are used as lubricants.

Compositions containing polycarbonate and Guerbet alcohols are known. Guerbet alcohols are the products of the Guerbet reaction.

Polycarbonate sheets are known for example from EP-A 0 110 221 and are produced for a variety of applications. Polycarbonate sheets are manufactured for example by extrusion of compositions containing polycarbonate.

Coextrusion with compositions that contain polycarbonate and that additionally contain UV absorbers is possible.

One problem that arises during extrusion of such sheets is the deposition of volatile components from the moulding composition on the calibrator (in the case of multi-wall sheets) or on the rolls (in the case of solid sheets), which can lead to surface defects on the sheets. Examples of volatile components include UV absorbers, mould release agents and other low-molecular components of the compositions.

EP-A 0 320 632 describes coextruded sheets consisting of compositions that contain polycarbonate, contain a UV absorber and can contain a lubricant. Disadvantageously, with extended extrusion of the composition according to EP-A 0 320 632 to form sheets, the surface of the sheets is adversely influenced by evaporations from the melt of compositions. During coextrusion the increased evaporation of the UV absorber from the melt of compositions leads to the formation of deposits on the calibrator or on the rolls and ultimately to the formation of defects on the surface of the sheets (e.g. white spots, waviness, etc.). On the calibrator, polycarbonate abrasion can, also lead to powdery deposits on the coextruded polycarbonate sheets.

Compositions consisting of esters of Guerbet alcohols and polycarbonates are also known. EP-A 0 390 994, for example, describes compositions containing special fatty acid esters of Guerbet alcohols as mould release agents.

EP-A 0 649 724 describes a process for the production of multi-layer sheets from branched polycarbonates with average molecular weights $\overline{M}_w$ of 27,000 g/mol to 29,500 g/mol by coextrusion of a core layer and at least one outer layer with 1 to 15 wt. % of a UV absorber. If the mould release agents glycerol monostearate, pentaerythritol tetrastearate or mixtures thereof as described in EP-A 0 300 485 are used in the compositions for production of these plastic sheets, the surface of the sheets nevertheless deteriorates over time.

It is known from WO 99/05205 that mixtures of mould release agents, consisting of fatty acid esters of pentaerythritol and glycerol for example, can be used to minimise the formation of deposits on the calibrator or on the rolls, which leads to the formation of defects on the surface of the sheets (e.g. white spots, waviness, etc.).

The object of the present invention is therefore to provide compositions containing polycarbonate that do not display the specified disadvantages of the compositions known from the prior art.

The object according to the invention is achieved by compositions containing polycarbonate and one or more different compounds with the general formula (I)

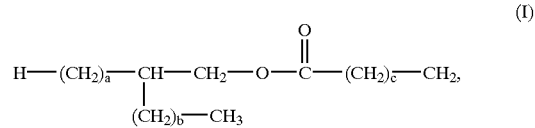

wherein
a equals 1 to 20,
b equals 1 to 25 and
c equals 10 to 40.

The object according to the invention is further achieved by the compositions cited in the previous paragraph, whereby these additionally contain one or more different compounds with the general formula (I)

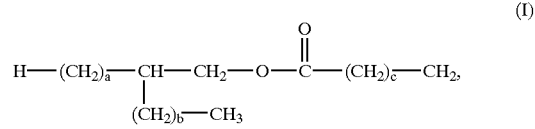

wherein
a equals 0,
b equals 1 to 25 and
c is 10 to 40.

In the case where a=1 to 20, b preferably equals 4 to 20 and c 10 to 24.

In the case where a=0, b preferably equals 4 to 20 and c 10 to 24.

Such compositions are preferred in which the proportion of compounds according to formula (I) is 0.02 to 1.0 wt. %, particularly 0.05 to 0.5 wt. %.

Such compositions are further preferred which additionally contain 0.01 to 0.5 wt. % of esters or partial esters, preferably fatty acid esters or fatty acid partial esters, of tetrahydric to hexahydric alcohols.

Such compositions are further preferred which additionally contain 0.1 to 15 wt. % of UV absorbers. The UV absorbers are preferably chosen from the group consisting of (bis[2-hydroxy-5-tert-octyl-2-(benzotriazol-2-yl)phenyl]methane), 2-(4,6-diphenyl-1,3,5-triazin-2-yl)-5-(hexyl)oxyphenol and 2-cyano-3,3-diphenyl propenoic acid-2,2-bis [[2-cyano-1-oxo-3,3-diphenyl-2-propenyl)oxy]methyl]-1,3-propanediyl ester.

Such compositions are further preferred which additionally contain 10 to 3000 ppm of heat stabilisers relative to the total quantity of composition. The heat stabiliser is preferably chosen from the group consisting of tris(2,4-di-tert-butylphenyl)phosphite and triphenyl phosphine.

The object according to the invention is further achieved by use of compounds with the general formula (I)

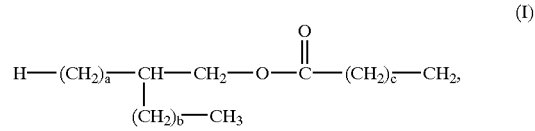

wherein
a equals 1 to 20,
b equals 1 to 25 and
c equals 10 to 40, to produce compositions containing polycarbonate and compounds with the general formula (I).

The object according to the invention is further achieved by the use of the compositions according to the invention to manufacture products containing these compositions.

The object according to the invention is further achieved by a process for the manufacture of products containing at least one outer layer containing the compositions according to the invention by extrusion or coextrusion.

The object according to the invention is further achieved by products containing the compositions according to the invention. These products are preferably sheets, roofing elements or glazing elements.

The object according to the invention is further achieved by a multi-layer product comprising a first layer containing polycarbonate and a second layer containing one of the previously mentioned compositions.

The object according to the invention is further achieved by a process for the manufacture of the specified multi-layer products by coextrusion.

The object according to the invention is further preferably achieved by a greenhouse, a conservatory, a bus shelter, an advertising hoarding, a sign, a safety screen, automotive glazing, a window or a roof containing a multi-layer product according to the invention.

The multi-layer products according to the invention contain preferably 0.1 to 15 wt. % of a UV absorber. They preferably contain 3 to 8 wt. % of a UV absorber.

The products according to the invention and the multi-layer products according to the invention are preferably solid sheets or corrugated sheets. Both the solid and the corrugated sheets preferably exhibit on one or both outer sides a layer consisting of the compositions according to the invention.

The products or multi-layer products according to the invention are preferably multi-wall sheets or multi-wall profiles, constructed according to the tongue-and-groove system, for example. These preferred products or multi-layer products likewise preferably exhibit on one or both outer sides an outer layer consisting of the compositions according to the invention.

In a further preferred embodiment of the present invention the multi-layer products according to the invention are characterised in that at least two layers consist of the compositions according to the invention, whereby the first sheet contains 0.1 to 15 wt. %, preferably 3 to 8 wt. % of a UV absorber and the second sheet contains 0.02 to 1.0 wt. % of a UV absorber.

In the compositions according to the invention the proportion of compounds according to formula (I) is preferably 0.02 to 1.0 wt. %, particularly preferably 0.05 to 0.5 wt. %, most particularly preferably 0.1 to 0.4 wt. %.

Preferred compounds according to the invention with the general formula (I), in which a=1 to 20, b=1 to 25 and c=10 to 40, are those in which a=1 to 10, b=4 to 20 and c=10 to 24.

Preferred compounds according to the invention with the general formula (I), in which a=0, b=1 to 25 and c=10 to 40, are those in which a=0, b=4 to 20 and c=10 to 24.

The compositions according to the invention preferably additionally contain 0.1 to 15 parts by weight, preferably 3 to 8 parts by weight of UV absorbers.

The compositions according to the invention preferably contain 80 to 99.8 wt. % polycarbonate.

The compositions according to the invention preferably contain bisphenol A homopolycarbonate as polycarbonate.

The compositions according to the invention can additionally contain further conventional processing aids, particularly mould release agents and flow control agents as well as further conventional stabilisers, particularly heat stabilisers.

The compositions according to the invention and the products manufactured therefrom can further contain organic dyestuffs, inorganic coloured pigments, fluorescent dyestuffs and particularly preferably optical brighteners.

Compounds with the general formula (I) are commercially available. They are conventionally used in the cosmetics sector. They can for example be obtained under the trade name Cetiol G 20 S from Cognis (Deutschland, Düsseldorf).

Compounds with the general formula (I) can be manufactured by conventional processes known to the person skilled in the art. The compounds with the general formula (I) are esters of linear carboxylic acids and alcohols branched in the β position. These esters can for example be produced by esterification of the carboxylic acids and alcohols by known methods. The branched alcohols can be described as Guerbet alcohols. Guerbet alcohols are the products of the Guerbet reaction and can for example be produced by the Guerbet reaction. The auto-condensation of alcohols under the influence of sodium or copper at approx. 200° C. and under elevated pressure is known as the Guerbet reaction.

The compositions according to the invention demonstrate numerous advantages. They can be readily processed and display no impairments in the articles obtained as product, such as sheets. Surprisingly it has been found that with the use of the compounds according to formula (I), even further additives known to be volatile no longer lead to the problems described in the introduction when used in compositions containing polycarbonate.

Polycarbonates according to the invention are homopolycarbonates, copolycarbonates and thermoplastic polyester carbonates. They preferably have average molecular weights $\overline{M}_w$ of 18,000 to 40,000 g/mol, preferably from 26,000 to 36,000 g/mol and particularly from 28,000 to 35,000 g/mol, determined by measuring the relative solution viscosity in dichloromethane or in mixtures of equal quantities by weight of phenol and o-dichlorobenzene adjusted by light scattering.

In the case of multi-layer products the melt viscosity of the coextrusion layers should preferably be lower than that of the substrate to which they are applied.

In regard to the manufacture of polycarbonates, reference is made by way of example to "Schnell", Chemistry and Physics of Polycarbonates, Polymer Reviews, Vol. 9, Interscience Publishers, New York, London, Sydney 1964, to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75–90 (1980), to D. Freitag, U. Grigo, P. R. Müller, N. Nouvertne, BAYER A G, "Polycarbonates" in Encyclopedia of Polymer Science and Engineering, Vol. 11, Second Edition, 1988, pages 648–718 and finally to Drs U. Grigo, K. Kircher and P. R. Müller "Polycarbonates" in Becker/Braun, Kunststoff-Handbuch, Volume 3/1, Polycarbonate, Polyacetale, Polyester, Celluloseester, Carl Hanser Verlag, Munich, Vienna 1992, pages 117–299. Production is preferably performed by the phase boundary method or the melt interesterification method and is described below using the phase boundary method by way of example.

The compounds preferably used as starting compounds are bisphenols with the general formula HO-Z-OH, wherein Z is a divalent organic radical having 6 to 30 carbon atoms and containing one or more aromatic groups.

Examples of such compounds are bisphenols belonging to the group of dihydroxydiphenyls, bis(hydroxyphenyl) alkanes, indane bisphenols, bis(hydroxyphenyl)ethers, bis (hydroxyphenyl)sulfones, bis(hydroxyphenyl)ketones and α,α'-bis(hydroxyphenyl)diusopropyl benzenes.

Particularly preferred bisphenols belonging to the previously cited group of compounds are bisphenol A, tetraalkyl bisphenol A, 4,4-(metaphenylene diisopropyl)diphenol (bisphenol M), 4,4-(paraphenylene diisopropyl)diphenol, 1,1-bis(4-hydroxyphenyl)-3,3,5-trimethylcyclohexane (BP-TMC), optionally together with mixtures thereof.

Particularly preferred are homopolycarbonates based on bisphenol A and copolycarbonates based on the monomers bisphenol A and 1,1-bis(4-hydroxyphenyl)-3,3,5-trimethylcyclohexane. The bisphenol compounds for use according to the invention are reacted with carbonic acid compounds, particularly phosgene or in the case of the melt interesterification process diphenyl carbonate or dimethyl carbonate.

Polyester carbonates are obtained by reacting the previously cited bisphenols, at least one aromatic dicarboxylic acid and optionally carbonic acid equivalents. Examples of suitable aromatic dicarboxylic acids include phthalic acid, terephthalic acid, isophthalic acid, 3,3'- or 4,4'-diphenyldicarboxylic acid and benzophenone dicarboxylic acids. A portion, up to 80 mol %, preferably from 20 to 50 mol % of the carbonate groups in the polycarbonates can be replaced by aromatic dicarboxylic acid ester groups.

Examples of inert organic solvents used in the phase boundary method include dichloromethane, the various dichloroethanes and chloropropane compounds, tetrachloromethane, trichloromethane, chlorobenzene and chlorotoluene, with chlorobenzene or dichloromethane or mixtures of dichloromethane and chlorobenzene preferably being used.

The phase boundary reaction can be accelerated by catalysts such as tertiary amines, particularly N-alkyl piperidines or onium salts. Tributylamine, triethylamine and N-ethyl piperidine are preferably used. In the melt interesterification process the catalysts cited in DE-A 4238123 are preferably used.

The polycarbonates can be deliberately and controllably branched by the use of small quantities of branching agents. Suitable branching agents include: phloroglucinol, 4,6-dimethyl-2,4,6-tri(4-hydroxyphenyl)heptene-2; 4,6-dimethyl-2,4,6-tri(4-hydroxyphenyl)heptane; 1,3,5-tri(4-hydroxyphenyl)benzene; 1,1,1-tri(4-hydroxyphenyl)ethane; tri(4-hydroxyphenyl)phenyl methane; 2,2-bis[4,4-bis-(4-hydroxyphenyl)cyclohexyl]propane; 2,4-bis(4-hydroxyphenyl isopropyl)phenol; 2,6-bis(2-hydroxy-5'-methylbenzyl)-4-methylphenol; 2-(4-hydroxyphenyl)-2-(2,4-dihydroxyphenyl)propane; hexa(4-(4-hydroxyphenyl isopropyl)phenyl)orthoterephthalic acid ester; tetra(4-hydroxyphenyl)methane; tetra-(4-(4-hydroxyphenyl isopropyl)phenoxy)methane; α,α'α''-tris(4-hydroxyphenyl)-1,3,5-triisopropyl benzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-dihydroxytriphenyl)methyl)benzene and in particular: 1,1,1-tri(4-hydroxyphenyl)ethane and bis(3-methyl-4-hydroxyphenyl)-2-oxo-2,3-dihydroindole.

The 0.05 to 2 mol % of branching agents or mixtures of branching agents that can optionally additionally be used, relative to the diphenols used, can be used together with the diphenols but are also added at a later stage of the synthesis.

Chain terminators can be used. Phenols such as phenol, alkyl phenols such as cresol and 4-tert-butyl phenol, chlorophenol, bromophenol, cumyl phenol or mixtures thereof are preferably used as chain terminators, in quantities of 1–20 mol %, preferably 2–10 mol % per mol of bisphenol. Phenol, 4-tert-butyl phenol or cumyl phenol are preferably used.

Chain terminators and branching agents can be added to the syntheses either separately or together with the bisphenol.

The manufacture of polycarbonates according to the melt interesterification process is described in DE-A 4 238 123 by way of example.

Suitable UV absorbers for the compositions according to the invention are preferably such compounds that because of their absorption capacity below 400 nm are capable of protecting polycarbonates effectively against UV light and exhibit a molecular weight of over 370, preferably of 500 and above.

Suitable UV absorbers are in particular the compounds described in WO 99/05205 with formula (II)

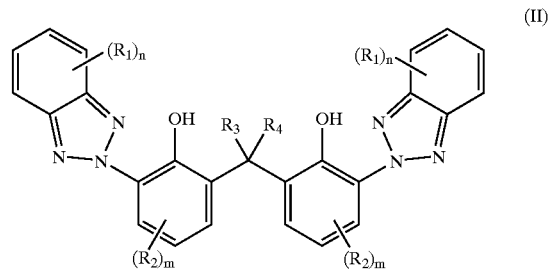

wherein $R^1$ and $R^2$ are the same or different and denote H, halogen, $C_1$–$C_{10}$ alkyl, $C_5$–$C_{10}$ cycloalkyl, $C_7$–$C_{13}$ aralkyl, $C_6$–$C_{14}$ aryl, —$OR^5$ or —(CO)—O—$R^5$ where $R^5$=H or $C_1$–$C_4$ alkyl, $R^3$ and $R^4$ are likewise the same or different and denote H, $C_1$–$C_4$ alkyl, $C_5$–$C_6$ cycloalkyl, benzyl or $C_6$–$C_{14}$ aryl, m is 1, 2 or 3 and n is 1, 2, 3 or 4, and those with formula (III)

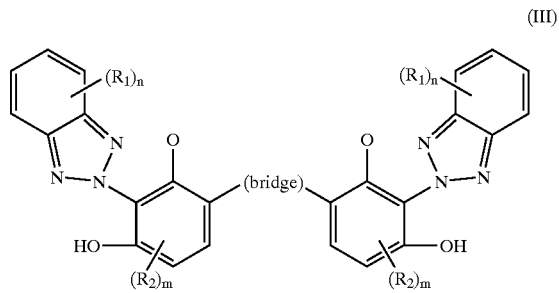

where the bridge denotes

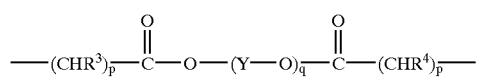

$R^1$, $R^2$, m and n have the meaning specified for formula (II), wherein moreover p is a whole number from 0 to 3, q is a whole number from 1 to 10, Y is —CH$_2$—CH$_2$—, —(CH$_2$)$_3$—, —(CH$_2$)$_4$—, —(CH$_2$)$_5$—, —(CH$_2$)$_6$—, or CH(CH$_3$)—CH$_2$— and R$^3$ and R$^4$ have the meaning specified for formula (II).

Further suitable UV absorbers are those that represent substituted triazines, such as 2,4-bis(2,4-dimethylphenyl)-6-(2-hydroxy-4-n-octyloxyphenyl)-1,3,5-triazine CYASORB® UV-1164) or 2-(4,6-diphenyl-1,3,5-triazin-2-yl)-5-(hexyl)oxyphenol (Tinuvin® 1577). Particularly preferred as UV absorber is 2,2-methylene-bis(4-(1,1,3,3-tetramethylbutyl)-6-(2H-benzotriazol-2-yl)phenol), which is sold commercially under the name Tinuvin® 360 or Adeka Stab® LA 31. The UV absorber Uvinul® 3030 from BASF AG obtained according to WO 96/15102, example 1, is also suitable. The UV absorbers cited in EP-A 0 500 496 and U.S. Pat. No. 5,959,012 are also suitable.

The UV absorbers are incorporated into the compositions according to the invention by conventional methods, for example by mixing solutions of the UV absorbers with solutions of the plastics in suitable organic solvents such as CH$_2$Cl$_2$, halogen alkanes, halogen aromatics, chlorobenzene and xylenes. The mixtures of substances are then preferably homogenised by extrusion by known means; the solution mixtures are preferably removed by known means by evaporating the solvent, followed by extrusion, for example compounding.

Suitable stabilisers for the polycarbonates for the compositions according to the invention are for example stabilisers containing phosphines, phosphites or silicon and other compounds described in EP-A 0 500 496. Examples to be mentioned include triphenyl phosphites, diphenyl alkyl phosphites, phenyl dialkyl phosphites, tris(nonylphenyl) phosphite, tetrakis(2,4-di-tert-butylphenyl)-4,4'-biphenylene diphosphonite and triaryl phosphite. Triphenyl phosphine and tris(2,4-di-tert-butylphenyl)phosphite are particularly preferred.

The compositions according to the invention can further contain 0.01 to 0.5 wt. % of (partial) esters of tetrahydric to hexahydric alcohols, particularly of pentaerythritol.

Examples of tetrahydric alcohols include pentaerythritol and mesoerythritol. Examples of pentahydric alcohols include arabitol, ribitol and xylitol. Examples of hexahydric alcohols include mannitol, glucitol (sorbitol) and dulcitol.

The esters are preferably the monoesters, diesters, triesters, tetraesters or optionally pentaesters and hexaesters or mixtures thereof, particularly random mixtures, of saturated aliphatic C$_{10}$ to C$_{26}$ monocarboxylic acids, preferably with saturated aliphatic C$_{14}$ to C$_{22}$ monocarboxylic acids.

The commercially obtainable fatty acid esters, particularly those of pentaerythritol, can contain up to 60% of various partial esters, depending on the production method.

Examples of saturated aliphatic monocarboxylic acids with 10 to 26 C atoms include decanoic acid, dodecanoic acid, tetradecanoic acid, hexadecanoic acid, octadecanoic acid, eicosanoic acid, docosanoic acid, tetracosanoic acid and hexacosanoic acid.

Examples of preferred saturated aliphatic monocarboxylic acids with 14 to 22 C atoms include tetradecanoic acid, hexadecanoic acid, octadecanoic acid, eicosanoic acid and docosanoic acid.

Saturated aliphatic monocarboxylic acids such as hexadecanoic acid and octadecanoic acid are particularly preferred.

The saturated aliphatic C$_{10}$ to C$_{26}$ carboxylic acids and the fatty acid esters according to the invention are either known per se from the literature or can be produced by methods known from the literature. Examples of pentaerythritol fatty acid esters are those of the particularly preferred monocarboxylic acids specified above.

Esters of pentaerythritol with octadecanoic acid and hexadecanoic acid are particularly preferred.

Examples of antistatics are cationic compounds, for example quaternary ammonium, phosphonium or sulfonium salts, anionic compounds, for example alkyl sulfonates, alkyl sulfates, alkyl phosphates, carboxylates in the form of alkali-metal salts or alkaline-earth metal salts, non-ionogenic compounds, for example polyethylene glycol esters, polyethylene glycol ethers, fatty acid esters, ethoxylated fatty amines. Preferred antistatics are non-ionogenic compounds.

All feedstocks and solvents used for synthesis of the coextrusion compositions according to the invention can be contaminated with corresponding impurities as a result of manufacture and storage conditions, the objective being to work with the cleanest possible starting materials.

The individual components can be mixed by known means, both successively and simultaneously, and at both room temperature and elevated temperature.

The additives are preferably incorporated into the compositions according to the invention by known means by mixing polymer granules with the additives at temperatures from around 200 to 400° C. in conventional units such as internal mixers, single-screw extruders and double-shaft extruders, for example by melt compounding or melt extrusion or by mixing the polymer solutions with solutions of the additives, followed by evaporation of the solvents by known means. The proportion of additives in the moulding composition can be varied between broad limits and is governed by the desired properties of the compositions. The total proportion of additives in the compositions is preferably up to around 20 wt. %, by preference 0.2 to 12 wt. %, relative to the weight of the composition.

As is underlined by the examples according to the invention, the use of the compositions according to the invention on any polycarbonate moulding compositions as base material offers a significant advantage. The base material for the sheet can also be treated with the mould release agent from the composition according to the invention.

The invention therefore also provides mouldings produced using the compositions according to the invention. The compositions can be used to produce solid plastic sheets and multi-wall sheets (e.g. twin-wall sheets). The sheets therefore also include those that display on one or both sides an additional outer layer with the compositions according to the invention having an elevated content of UV absorbers.

The compositions according to the invention simplify the manufacture of products, particularly of sheets and products produced therefrom, such as glazing for greenhouses, conservatories, bus shelters, advertising hoardings, signs, protective screens, automotive glazing, windows and roofs.

Subsequent processing steps for products coated with the compositions according to the invention, e.g. thermoforming or surface treatments, e.g. application of scratch-resistant coatings, water-spreading layers and similar are possible and the present invention likewise provides the products manufactured by these methods.

Coextrusion is known per se from the literature (see for example EP-A 0 110 221 and EP-A 0 110 238).

In the present case the procedure is preferably performed as follows:

Extruders are connected to a coextrusion adapter to produce the core and outer layer(s). The adapter is designed in such a way that the melts forming the outer layer(s) are applied adhesively as a thin layer to the melt of the core.

The multi-layer melt strand produced in this way is then transferred to the adjacent die in the desired form (multi-wall sheet or solid sheet). The melt is then cooled under controlled conditions by known means by calendering (solid sheet) or vacuum calibration (multi-wall sheet) and then cut into lengths. A conditioning oven can optionally be connected after the calibration stage to eliminate stresses. In place of the adapter connected before the die, the die itself can also be designed in such a way that the melts are brought together there.

The invention is illustrated by means of the following example.

EXAMPLE 10 mm twin-wall sheets A to F, such as are described for example in EP-A 0 110 238, were obtained from the following compositions: Makrolon® KU 1-1243 (branched bisphenol A polycarbonate from Bayer A G, Leverkusen, Germany, with a melt flow rate (MFR) of 6.5 g/10 min at 300° C. and 1.2 kg load) was used as base material. This was coextruded with the compounds listed in the table and based on Makrolon® 3100 (linear bisphenol A polycarbonate from Bayer A G, Leverkusen, Germany, with a melt flow rate (MFR) of 6.5 g/10 min at 300° C. and 1.2 kg load).

The thickness of the coextrusion layer was around 50 μm in each case.

| Sheet | UV absorber | Mould release agent |
|---|---|---|
| A | 5 wt. % Tinuvin 360 | 0.2 wt. % according to invention*) |
| B | 5 wt. % Tinuvin 360 | 0.3 wt. % according to invention*) + 0.1 wt. % PETS**) |
| C | 5 wt. % Tinuvin 360 | 0.1 wt. % according to invention*) + 0.1 wt. % PETS**) |
| D | 5 wt. % Tinuvin 360 | 0.2 wt. % 2-octyldodecyl-12-stearoyl stearate****) |
| E | 5 wt. % Tinuvin 360 | 0.25 wt. % PETS**) |
| F | 5 wt. % Tinuvin 360 | 0.1 wt. % PETS**) + 0.05 wt. % GMS***) |

*)Commercially obtainable, Cetiol ® G 20 S from Cognis Düsseldorf, Germany
**)Commercially obtainable, Loxiol ® VPG 861 from Cognis, Düsseldorf, Germany
***)Commercially obtainable, Loxiol ® EP 129 from Cognis, Düsseldorf, Germany
****)Commercially obtainable, Ceraphyl ® 847 from ISP, 1361 Alys Road, Wayne, NJ 07470, USA
PETS = pentaerythritol tetrastearate
GMS = glycerol monostearate The machines and equipment used to produce multi-layer multi-wall sheets are described below.

The apparatus consisted of the main extruder with a screw of length 33 D and a diameter of 70 mm with venting the coex adapter (feedblock system)

a coextruder for applying the outer layer with a screw of length 25 D and a diameter of 30 mm the special sheet extrusion die with a width of 350 mm the calibrator the roller conveyor the take-off unit the flying knife (saw)

the stacking table.

The polycarbonate granules forming the base material were supplied to the feed hopper for the main extruder, the UV coextrusion material to that for the coextruder. In each case the material is melted and conveyed in the corresponding cylinder/screw plasticising system. Both material melts were brought together in the coex adapter and formed a composite after leaving the die and being cooled in the calibrator. The other equipment served to transport, cut to length and stack the extruded sheets.

Coextrusion with D (Reference):
first minor deposits after 4 hours
slight transverse waves appearing after 90 minutes at irregular intervals, which have a slightly negative influence on the sheet quality.
Somewhat stronger transverse waves after 4½ hours.
rating: good Coextrusion with E (Reference):
first minor defects after 50 minutes (transverse waves, small white blisters)
more significant defects after 90 minutes (warping of cross-pieces, white deposits, transverse waves)
rating: poor Coextrusion with F (Reference):
first minor defects after 90 minutes (small white blisters)
more significant defects after 100 minutes (warping of cross-pieces, white deposits)
rating: satisfactory to poor Coextrusion with A:
no deposits over a test period of 5 hours
slight transverse waves appearing after 90 minutes at irregular intervals, which have a slightly negative influence on the sheet quality
rating: very good Coextrusion with B:
no deposits over a test period of 5 hours
slight transverse waves appearing after 90 minutes at irregular intervals, which have a slightly negative influence on the sheet quality
rating: very good Coextrusion with C:
no deposits over a test period of 5 hours
slight transverse waves appearing after 90 minutes at irregular intervals, which have a slightly negative influence on the sheet quality
rating: very good

What is claimed is:

1. Compositions comprising:

(A) polycarbonate and (B) one or more different compounds with the general formula (I)

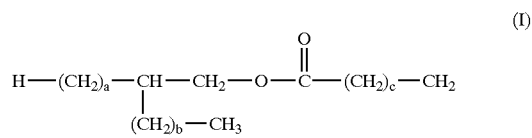

wherein
a equals 1 to 20
b equals 1 to 25 and
c equals 10 to 40; and (C) one or more different compounds represented by general formula (I)
wherein
a equals 0,
b equals 1 to 25, and
c is 10 to 40.

2. Compositions according to claim 1 where the proportion of compounds according to formula (I) is 0.02 to 1.0 wt. %.

3. Compositions according to claim 1 further containing 0.01 to 0.5 wt. % of esters or partial esters of tetrahydric to hexahydric alcohols.

4. Compositions according to claim 1 further containing 0.1 to 15 wt. % of UV absorbers.

5. Compositions according to claim 4, whereby the UV absorber is selected from the group consisting of (bis[2-hydroxy-5-tert-octyl-2-(benzotriazol-2-yl)phenyl]methane), 2-(4,6-diphenyl-1,3,5-triazin-2-yl)-5-(hexyl)oxyphenol and 2-cyano-3,3-diphenyl propenoic acid-2,2-bis[[2-cyano-1-oxo-3,3-diphenyl-2-propenyl)oxy]methyl]-1,3-propanediyl ester.

6. Compositions according to claim 1 further containing 10 to 3000 ppm of heat stabilisers, relative to the total quantity of the composition.

7. Compositions according to claim 6, whereby the heat stabiliser is selected from the group consisting of tris-(2,4-di-tert-butylphenyl)phosphite and triphenyl phosphine.

8. A molded article comprising the composition of claim 1.

* * * * *

UNITED STATES PATENT AND TRADEMARK OFFICE
CERTIFICATE OF CORRECTION

PATENT NO. : 6,861,460 B2
DATED : March 1, 2005
INVENTOR(S) : Rüdiger Gorny et al.

It is certified that error appears in the above-identified patent and that said Letters Patent is hereby corrected as shown below:

Column 10,
Line 50, delete the formula and insert:

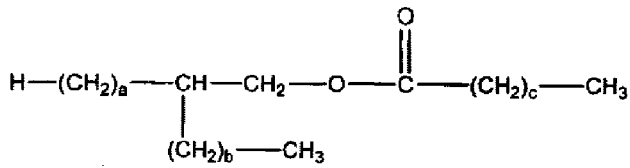

Signed and Sealed this

Fourteenth Day of June, 2005

JON W. DUDAS
*Director of the United States Patent and Trademark Office*